United States Patent
Tang (10) Patent No.: US 12,096,367 B2
(45) Date of Patent: Sep. 17, 2024

(54) DISCONTINUOUS RECEPTION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/638,663

(22) PCT Filed: Aug. 25, 2017

(86) PCT No.: PCT/CN2017/099154
§ 371 (c)(1),
(2) Date: Feb. 12, 2020

(87) PCT Pub. No.: WO2019/037119
PCT Pub. Date: Feb. 28, 2019

(65) Prior Publication Data
US 2021/0195527 A1  Jun. 24, 2021

(51) Int. Cl.
*H04W 52/02* (2009.01)
*H04W 76/28* (2018.01)

(52) U.S. Cl.
CPC ... *H04W 52/0235* (2013.01); *H04W 52/0216* (2013.01); *H04W 76/28* (2018.02)

(58) Field of Classification Search
CPC ......... H04W 52/0235; H04W 52/0216; H04W 76/28; H04W 52/0229; H04W 72/23; H04W 52/02; Y02D 30/70
See application file for complete search history.

(56) References Cited

U.S. PATENT DOCUMENTS 8,743,859 B2   6/2014   Lee et al.
9,084,162 B2   7/2015   Shetty et al.
(Continued)

FOREIGN PATENT DOCUMENTS

CN   102210109 A   10/2011
CN   103889039 A   6/2014
(Continued)

OTHER PUBLICATIONS

Qualcomm "Wake Up Schemes for DRX in NR" (Year: 2017).*
(Continued)

*Primary Examiner* — Ayanah S George
(74) *Attorney, Agent, or Firm* — Young Basile Hanlon & MacFarlane, P.C.

(57) ABSTRACT

The present application discloses a discontinuous reception method, a terminal device, and a network device. The method comprises: a terminal device detecting a downlink control channel sent by a network device, wherein the downlink control channel carries at least one discontinuous reception (DRX) information of at least one terminal device, and the DRX information of each terminal device of the at least one terminal device is used to indicate that each terminal device wakes up or sleeps during an on-duration of a DRX cycle; the terminal device determining the DRX information of the terminal device from the at least one DRX information; and the terminal device determining, according to the DRX information of the terminal device, whether the terminal wakes up during the on-duration or sleeps during the on-duration.

16 Claims, 5 Drawing Sheets

(56) References Cited

U.S. PATENT DOCUMENTS

| | | | |
|---|---|---|---|
| 9,313,736 | B2 | 4/2016 | Cucala Garcia |
| 2009/0285141 | A1 | 11/2009 | Cai et al. |
| 2010/0118815 | A1 | 5/2010 | Kim et al. |
| 2011/0138209 | A1 | 6/2011 | Kim et al. |
| 2012/0257559 | A1* | 10/2012 | Kim ................... H04L 1/1854 370/311 |
| 2012/0275366 | A1* | 11/2012 | Anderson .......... H04W 52/0219 370/311 |
| 2015/0098384 | A1* | 4/2015 | Deng ................... H04L 1/0046 370/312 |
| 2017/0215222 | A1 | 7/2017 | Cheng et al. |
| 2018/0332655 | A1* | 11/2018 | Ang ................. H04W 52/0216 |

FOREIGN PATENT DOCUMENTS

| | | | |
|---|---|---|---|
| CN | 105122858 A | 12/2015 | |
| CN | 106256145 A | 12/2016 | |
| EP | 2465308 B1 | 6/2012 | |
| JP | 2010062743 A | 3/2010 | |
| JP | 2010519793 A | 6/2010 | |
| JP | 2013527703 A | 6/2013 | |
| KR | 101206084 B1 | 11/2012 | |
| RU | 2535785 C2 | 12/2014 | |
| WO | WO-2010005219 A2 * | 1/2010 | ........ H04W 52/0225 |
| WO | 2012061398 A1 | 5/2012 | |
| WO | 2013046467 A1 | 4/2013 | |
| WO | 2017009053 A1 | 1/2017 | |

OTHER PUBLICATIONS

Qualcomm Inc., Apple, OPPO , Wake up Signaling for C-DRX mode (Year: 2017).*
Qualcomm Incorporated. 3GPP TSG-RAN WG2 Meeting NR ad-hoc 2. R2-1706524. Wake-Up Schemes for DRX in NR. Jun. 29, 2017 (Jun. 29, 2017), 2. Wake-Up Schemes Description.
Qualcomm Incorporated. 3GPP TSG-RAN WG2 Meeting #98. Wake-Up Schemes for DRX in NR. May 19, 2017 (May 19, 2017), 2. Wake-Up Schemes Description.
Qualcomm Incorporated. 3GPP TSG-RAN WG 1 #87. R1-1612068. UE Power Evaluation for DRX with Wake-Up Signaling. Nov. 18, 2016 (Nov. 18, 2016), 2.4 CDRX with Wake-Up Signaling.
Extended European Search Report for EP Application 17922236.9 mailed Sep. 9, 2020.
3GPP TSG RAN WG1 Meeting #90; Aug. 21-25, 2017; Prague, Czech Republic; R1-1713426.
3GPP TSG-RAN WG2 #99; Berlin, Germany, Aug. 21-25, 2017; R2-1708189.
3GPP TSG RAN WG1 Meeting #90; Prague, Czechia, Aug. 21-25, 2017; R1-1712806.
3GPP TSG RAN WG2 NR #99; Aug. 21-25, 2017; Berlin, Germany; R2-1709652.
3GPP TSG RAN WG1 Meeting #89; Hangzhou, China, May 15-19, 2017; R1-1708796.
3GPP TSG-RAN WG1 #89; Hangzhou, P.R. China May 15-19, 2017; R1-1706882.
Russia Decision on Grant with English Translation for RU Application 2020108504/07(013889) mailed Sep. 14, 2020.
Canadian Examination Report for CA Application 3072973 mailed Apr. 1, 2021. (3 pages).
Korean First Examination Report with English Translation for KR Application 10-2020-7004345 mailed Mar. 2, 2021. (12 pages).
Indian Examination Report for IN Application 202017005754 mailed May 31, 2021. (6 pages).
Singapore Invitation to Respond to Written Opinion for SG Application 11202001256Q mailed Jul. 15, 2021. (7 pages).
Communication pursuant to Article 94(3) EPC for EP Application 17922236.9 mailed Aug. 11, 2021. (6 pages).
Japanese Office Action with English Translation for JP Application 2020-508402 mailed Jun. 25, 2021. (8 pages).
Canadian Examination Report for CA Application 3072973 mailed Feb. 14, 2022. (3 pages).
Japanese Office Action with English Translation for JP Application 2020508402 mailed Feb. 15, 2022. (6 pages).
Australian Examination Report for AU Application 2017428589 mailed Oct. 20, 2022. (3 pages).
Communication pursuant to Article 94(3) EPC for EP Application 17922236.9 mailed Aug. 11, 2022. (6 pages).
Japanese Decision to Grant a Patent with English Translation for JP Application 2020508402 mailed Aug. 26, 2022. (5 pages).
Indonesia First Office Action with English Translation for ID Application P00202002055 mailed Aug. 8, 2022. (5 pages).
Singapore Second Written Opinion for SG Application 11202001256Q mailed Sep. 21, 2022. (7 pages).
Canada Third Examination for Application No. 3072973 mailed Nov. 23, 2022.
China First Office Action with English Translation for CN Application 201780094284.7 mailed Nov. 24, 2022.
Australian Examination Report No. 2 for AU Application 2017428589 mailed Feb. 28, 2023. (3 pages).
Chinese Second Office Action with English Translation for CN Application 2017800942847 mailed Apr. 29, 2023. (20 pages).
Australian Examination Report No. 3 for AU Application 2017428589 mailed Jul. 24, 2023. (3 pages).
Chinese Third Office Action with English Translation for CN Application 201780094284.7 mailed Sep. 25, 2023. (24 pages).
UE Power Saving Scheduling Method Using DRX for Video Streaming in LTE; Tian Jian-Jun, Qiu Ling; 15 pages; PCN & SS Lab, Dept EEIS, University of Science and Technology of China, Hefei 230027, China with English Translation.
A Delay Based Dynamic Discontinuous Reception Cycle Adjusting Scheme; Huang Bo, Tian Hui, Xu Hai-bo; 20 pages; Key Laboratory of Universal Wireless Communications Ministry of Education Wireless Technology Innovation Institute Beijing University of Posts and Telecommunications Beijing 100876 China with English Translation.
Vietnam Substantive Examination Report with English Translation for VN Application 1202001373 mailed May 31, 2023. (4 pages).
Japanese Notice of Reasons for Refusal with English Translation for JP Application 2022096441 mailed Jun. 27, 2023. (06 pages).
Mexican First Substantive Examination requirement is reported with English Translation for MX Application MX/a/2020/001861 mailed Apr. 28, 2023. (6 pages).
Japanese Notice of Reasons for Refusal with English Translation for JP Application 2022096441 mailed Nov. 7, 2023. (6 pages).
Mexican Second Substantive Examination requirement is reported with English Translation for MX Application MX/a/2020/001861 mailed Oct. 25, 2023. (13 pages).
Chinese Rejection decision with English Translation for CN Application 2017800942847 mailed Dec. 8, 2023 (25 pages).
Indian Hearing Notice for IN Application 202017005754 mailed Dec. 11, 2023. (2 pages).

* cited by examiner

```
┌─────────────────────────────────────────────┐
│ A first terminal device detects a downlink  │
│ control channel sent by a network device,   │
│ wherein the downlink control channel        │
│ carries at least one piece of DRX           │──── 310
│ information of at least one terminal        │
│ device, and DRX information of each         │
│ terminal device of the at least one         │
│ terminal device is used for indicating      │
│ that the each terminal device wakes up or   │
│ sleeps during an on-duration of a DRX cycle │
│ after the DRX information of the each       │
│ terminal device                             │
└─────────────────────────────────────────────┘
                      │
                      ▼
┌─────────────────────────────────────────────┐
│ The first terminal device determines DRX    │
│ information of the first terminal device    │──── 320
│ from the at least one piece of DRX          │
│ information                                 │
└─────────────────────────────────────────────┘
                      │
                      ▼
┌─────────────────────────────────────────────┐
│ The first terminal device wakes up or       │
│ sleeps during the on-duration of the DRX    │──── 330
│ cycle according to the DRX information of   │
│ the first terminal device                   │
└─────────────────────────────────────────────┘
```

FIG. 3

```
┌─────────────────────────────────────────────┐
│ A network device determines at least one    │
│ piece of discontinuous reception (DRX)      │
│ information of at least one terminal        │
│ device, wherein DRX information of each     │
│ terminal device of the at least one         │──── 410
│ terminal device is used for indicating      │
│ that the each terminal device wakes up or   │
│ sleeps during an on-duration of a DRX cycle │
│ after the DRX information of the each       │
│ terminal device                             │
└─────────────────────────────────────────────┘
                      │
                      ▼
┌─────────────────────────────────────────────┐
│ The network device sends a downlink         │
│ control channel to a first terminal device, │──── 420
│ wherein the downlink control channel        │
│ carries the at least one piece of DRX       │
│ information                                 │
└─────────────────────────────────────────────┘
```

DISCONTINUOUS RECEPTION METHOD, TERMINAL DEVICE AND NETWORK DEVICE

CROSS-REFERENCE TO RELATED APPLICATION(S)

This application is a 371 application of International Application No. PCT/CN2017/099154, filed on Aug. 25, 2017, the entire disclosure of which is hereby incorporated by reference.

TECHNICAL FIELD

Implementations of the present application relate to the field of wireless communication, and more particularly, relate to a discontinuous reception method, a terminal device, and a network device.

BACKGROUND

Discontinuous Reception (DRX) mechanism is introduced for the sake of power saving of a terminal device. Each DRX Cycle includes an on-duration and an Opportunity for DRX. When in the on-duration, the terminal device detects a control channel. When in the Opportunity for DRX, the terminal device can reduce power consumption by stopping receiving the control channel (in this case, the terminal device stops the blind detection of the control channel), thus prolonging battery life.

Although the network configures the terminal device with the DRX mechanism so that the terminal device periodically detects the control channel during the on-duration, the terminal device is scheduled only by chance during the on-duration. Even when the service load is very low, the terminal device will be scheduled only in a few DRX cycles. For a paging message using the DRX mechanism, the terminal has less chance to receive the paging message. Therefore, after being configured with the DRX mechanism, the terminal device may not be able to detect the control channel during most on-durations, but it will still be woken up, which increases unnecessary power consumption. Therefore, how different terminal devices know whether they are scheduled in the DRX cycle to further reduce power consumption has become an urgent problem to be solved.

SUMMARY

Implementations of the present application provide a discontinuous reception method, a terminal device and a network device.

In a first aspect, a discontinuous reception method is provided. The method includes: detecting, by a first terminal device, a downlink control channel sent by a network device, wherein the downlink control channel carries at least one piece of discontinuous reception (DRX) information of at least one terminal device, and DRX information of each terminal device of the at least one terminal device is used for indicating that the each terminal device wakes up or sleeps during an on-duration of a DRX cycle after the DRX information of the each terminal device; determining, by the first terminal device, DRX information of the first terminal device from the at least one piece of DRX information; and waking up or sleeping, by the first terminal device, during the on-duration according to the DRX information of the first terminal device.

Therefore, a network device simultaneously indicates multiple pieces of DRX information of multiple terminal devices to the multiple terminal devices, and a first terminal device of the multiple terminal devices determines its own DRX information among the multiple pieces of DRX information and wakes up or sleeps during an on-duration of a subsequent DRX cycle according to its own DRX information. Since the first terminal device can sleep during the on-duration of the DRX cycle when it is not scheduled in the subsequent DRX cycle, the power consumption of the first terminal device is further reduced.

In one possible implementation, the downlink control channel carries at least one bit value, the at least one bit value corresponds to the at least one piece of DRX information one by one, and each bit value in the at least one bit value is used for representing DRX information corresponding to the each bit value.

In one possible implementation, before the first terminal device detects the downlink control channel sent by the network device, the method further includes: determining, by the first terminal device, a control channel group to which the downlink control channel belongs according to a device identity of the first terminal device; and determining, by the first terminal device, a target radio network temporary identity (RNTI) corresponding to the control channel group according to a mapping relationship between multiple control channel groups and multiple RNTIs; wherein detecting, by the first terminal device, the downlink control channel sent by the network device includes: detecting, by the first terminal device, the downlink control channel according to the target RNTI.

For example, the first terminal device calculates a number of the control channel group in which the downlink control channel is located according to the device Identity (ID) of the first terminal device, such as UE-ID, and based on UE-ID mod M. M is a positive integer and M is the total quantity of control channel groups. The first terminal device determines an RNTI used for detecting the downlink control channel according to the calculated number of the control channel group and the mapping relationship between M control channel groups and M RNTIs, and detects the downlink control channel according to the target RNTI.

Optionally, the mapping relationship between multiple control channel groups and multiple RNTIs may be notified by the network device through a radio resource control (RRC) signaling to the terminal device, or the mapping relationship may be pre-agreed between the terminal device and the network device and pre-stored in the terminal device.

In one possible implementation, before the first terminal device detects the downlink control channel sent by the network device, the method further includes: receiving, by the first terminal device, first configuration information sent by the network device, wherein the first configuration information indicates a target RNTI used for detecting the downlink control channel; wherein detecting, by the first terminal device, the downlink control channel sent by the network device includes: detecting, by the first terminal device, the downlink control channel according to the target RNTI.

In one possible implementation, before the first terminal device detects the downlink control channel sent by the network device, the method further includes: receiving, by the first terminal device, second configuration information sent by the network device, wherein the second configuration information is used for indicating a channel format of the downlink control channel; wherein detecting, by the first terminal device, the downlink control channel sent by the network device includes: detecting, by the first terminal device, the downlink control channel according to the channel format of the downlink control channel.

In one possible implementation, detecting, by the first terminal device, the downlink control channel sent by the network device includes: detecting, by the first terminal device, the downlink control channel sent by the network device before the DRX cycle; or detecting, by the first terminal device, the downlink control channel sent by the network device in a first subframe or a first slot during the on-duration of the DRX cycle; or detecting, by the first terminal device, the downlink control channel sent by the network device in a common search space of a control channel.

In one possible implementation, determining, by the first terminal device, the DRX information of the first terminal device from the at least one piece of DRX information includes: determining, by the first terminal device, the DRX information of the first terminal device according to a number of the first terminal device, wherein the DRX information of the first terminal device is DRX information corresponding to the number in the at least one piece of DRX information.

In one possible implementation, before the first terminal device determines the DRX information of the first terminal device according to the number of the first terminal device, the method further includes: receiving, by the first terminal device, third configuration information sent by the network device, wherein the third configuration information is used for indicating the number of the first terminal device.

In a second aspect, a discontinuous reception method is provided. The method includes: determining, by a network device, at least one piece of discontinuous reception (DRX) information of at least one terminal device, wherein DRX information of each terminal device of the at least one terminal device is used for indicating that the each terminal device wakes up or sleeps during an on-duration of a DRX cycle after the DRX information of the each terminal device; and sending, by the network device, a downlink control channel to a first terminal device, wherein the downlink control channel carries the at least one piece of DRX information, so that the first terminal device determines DRX information of the first terminal device from the at least one piece of DRX information, and wakes up or sleeps during the on-duration according to the DRX information of the first terminal device.

Therefore, a network device realizes indication of DRX information at the device level by simultaneously indicating multiple pieces of DRX information of multiple terminal devices to the multiple terminal devices, so that the multiple terminal devices can wake up or sleep during an on-duration in a subsequent DRX cycle according to the respective DRX information after determining the respective DRX information from the multiple pieces of DRX information. Thus a terminal device that is not scheduled in the subsequent DRX cycle can sleep during the on-duration in the DRX cycle, further reducing power consumption.

In one possible implementation, the downlink control channel carries at least one bit value, the at least one bit value corresponds to the at least one piece of DRX information one by one, and each bit value in the at least one bit value is used for representing DRX information corresponding to the each bit value.

In one possible implementation, before the network device sends the downlink control channel to the first terminal device, the method further includes: sending, by the network device, a mapping relationship between multiple control channel groups and multiple radio network temporary identities (RNTIs) to the first terminal device, wherein a target RNTI used by the first terminal device for detecting the downlink control channel is an RNTI corresponding to a control channel group to which the downlink control channel belongs.

In one possible implementation, before the network device sends the downlink control channel to the first terminal device, the method further includes: sending, by the network device, first configuration information to the first terminal device, wherein the first configuration information indicates a target RNTI used for detecting the downlink control channel.

In one possible implementation, before the network device sends the downlink control channel to the first terminal device, the method further includes: sending, by the network device, second configuration information to the first terminal device, wherein the second configuration information is used for indicating a channel format of the downlink control channel.

In one possible implementation, sending, by the network device, the downlink control channel to a first terminal device includes: sending, by the network device, the downlink control channel to the first terminal device before the DRX cycle; or sending, by the network device, the downlink control channel to the first terminal device in a first subframe or a first slot during the on-duration of the DRX cycle; or sending, by the network device, the downlink control channel to the first terminal device in a common search space of a control channel.

In one possible implementation, before the network device sends the downlink control channel to the first terminal device, the method further includes: sending, by the network device, third configuration information to the first terminal device, wherein the third configuration information indicates a number of the first terminal device, and the DRX information of the first terminal device is DRX information corresponding to the number in the at least one piece of DRX information.

In a third aspect, a terminal device is provided. The terminal device may perform operations of the terminal device in the first aspect or any optional implementation of the first aspect. Specifically, the terminal device may include modules configured to perform operations of the terminal device in the first aspect or any possible implementation of the first aspect.

In a fourth aspect, a network device is provided. The network device may perform operations of the network device in the second aspect or any optional implementation of the second aspect. Specifically, the network device may include modules configured to perform operations of the network device in the second aspect or any possible implementation of the second aspect.

In a fifth aspect, a terminal device is provided. The terminal device includes: a processor, a transceiver, and a memory. The processor, the transceiver, and the memory communicate with each other through an internal connection path. The memory is configured to store instructions, and the processor is configured to execute the instructions stored in the memory. When the processor executes the instructions stored in the memory, the execution causes the terminal device to execute the method in the first aspect or any possible implementation of the first aspect, or the execution causes the terminal device to implement the terminal device provided in the third aspect.

In a sixth aspect, a network device is provided. The network device includes: a processor, a transceiver, and a memory. The processor, the transceiver, and the memory communicate with each other through an internal connection path. The memory is configured to store instructions, and the processor is configured to execute the instructions stored in the memory. When the processor executes the instructions stored in the memory, the execution causes the network device to execute the method in the second aspect or any possible implementation of the second aspect, or the execution causes the network device to implement the network device provided in the fourth aspect.

In a seventh aspect, a computer-readable storage medium is provided. The computer-readable storage medium stores a program that causes a terminal device to execute any discontinuous reception method in the first aspect and various implementations thereof.

In an eighth aspect, a computer-readable storage medium is provided. The computer-readable storage medium stores a program that causes a network device to execute any discontinuous reception method in the second aspect and various implementations thereof.

In a ninth aspect, a system chip is provided. The system chip includes an input interface, an output interface, a processor, and a memory, wherein the processor is configured to execute instructions stored in the memory, and when the instructions are executed, the processor may implement the method in the above first aspect or in any possible implementation of the first aspect.

In a tenth aspect, a system chip is provided. The system chip includes an input interface, an output interface, a processor, and a memory, wherein the processor is configured to execute instructions stored in the memory, and when the instructions are executed, the processor may implement the method in the above second aspect or in any possible implementation of the second aspect.

In an eleventh aspect, a computer program product containing instructions is provided, when the computer program product is run on a computer, the computer is caused to execute the method in the above first aspect or in any possible implementation of the first aspect.

In a twelfth aspect, a computer program product containing instructions is provided, when the computer program product is run on a computer, the computer is caused to execute the method in the above second aspect or in any possible implementation of the second aspect.

DETAILED DESCRIPTION

Hereinafter, technical solutions in the implementations of the present application will be described with reference to the accompanying drawings.

It should be understood that the technical solutions of the implementations of the present application may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

Various implementations are described herein in connection with terminal devices in the present application. The terminal device may refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an on-board device, a wearable device, a terminal device in a future 5G network, or a terminal device in a future evolving Public Land Mobile Network (PLMN), etc.

Various implementations are described herein in connection with a network device in the present application. The network device may be a device for communicating with a terminal device, such as a Base Transceiver Station (BTS) in a GSM system or a CDMA system, a NodeB (NB) in a WCDMA system, or an Evolutional Node B (eNB or eNodeB) in an LTE system, or the network device may be a relay station, an access point, a vehicle-mounted device, a wearable device, a network side device in a future 5G network, or a network side device in a future evolved PLMN network, etc.

Figure 1:
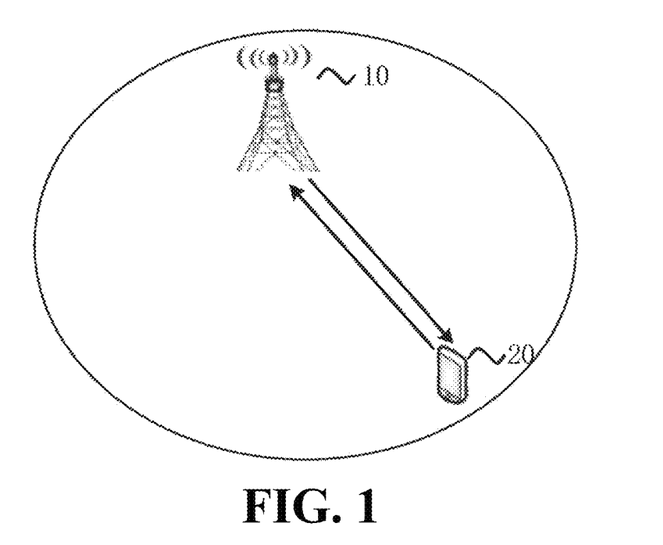
FIG. 1 is a schematic diagram of architecture of an application scenario according to an implementation of the present application.

FIG. 1 is a schematic diagram of an application scenario of an implementation of the present application. The communication system in FIG. 1 may include a network device 10 and a terminal device 20. The network device 10 is configured to provide communication services for the terminal device 20 and is connected to a core network. The terminal device 20 may access the network by searching for a synchronization signal, or a broadcast signal or other signals, transmitted by the network device 10, to communicate with the network. Arrows shown in FIG. 1 may represent uplink/downlink transmission through cellular links between the terminal device 20 and the network device 10.

The network in the implementation of the present application may refer to a Public Land Mobile Network (PLMN) or a device-to-device (D2D) network or a machine-to-machine/man (M2M) network or other networks. FIG. 1 is a simplified schematic diagram of an example, and other terminal devices may be included in the network and are not shown in FIG.

Figure 2:
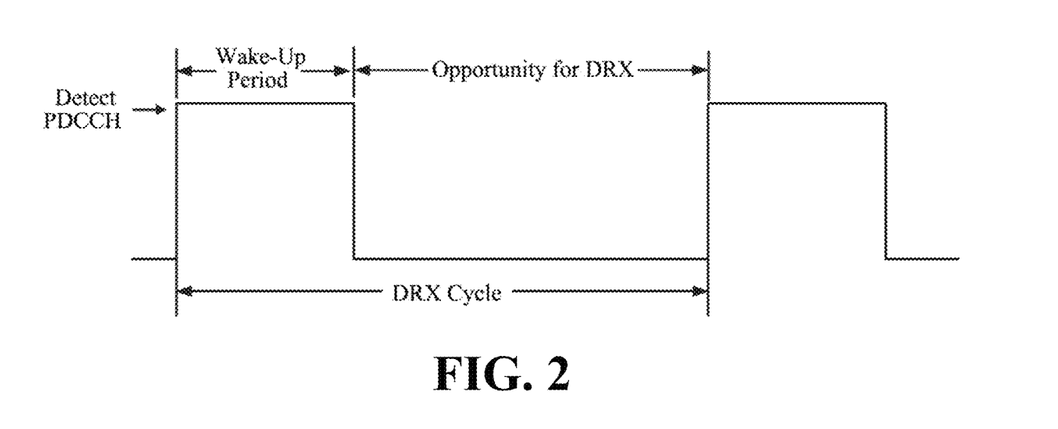
FIG. 2 is a schematic diagram of a DRX cycle.

The DRX cycle of the terminal device includes an on-duration and an Opportunity for DRX. As shown in FIG. 2, the terminal device can detect (or monitor) a Physical Downlink Control Channel (PDCCH) during the on-duration, while during the Opportunity for DRX, the terminal device can reduce power consumption by stopping receiving the PDCCH (in this case, the terminal device stops the blind detection of the PDCCH), thus prolonging battery life. In other words, during the on-duration period, the terminal device is in a wake-up state so as to detect the PDCCH, and during the Opportunity for DRX, the terminal device enters a sleep state so as not to detect a channel or signal.

Although the network configures the terminal device with the DRX cycle so that the terminal device periodically detects the PDCCH during the on-duration, the terminal device is scheduled only by chance during the on-duration. Even when the service load is very low, the terminal device will be scheduled only in a few DRX cycles. For a paging message using the DRX mechanism, the terminal has less chance of receiving the paging message. Therefore, after being configured with the DRX mechanism, the terminal device may detect no control channel during on-durations of most DRX cycles, but it will still be woken up during the on-duration of these DRX cycles, which increases unnecessary power consumption of the terminal device. Therefore, different terminal devices need to know whether they are actually scheduled during the on-duration in the DRX cycle, so as to remain asleep when not scheduled to further reduce power consumption.

Figure 3:
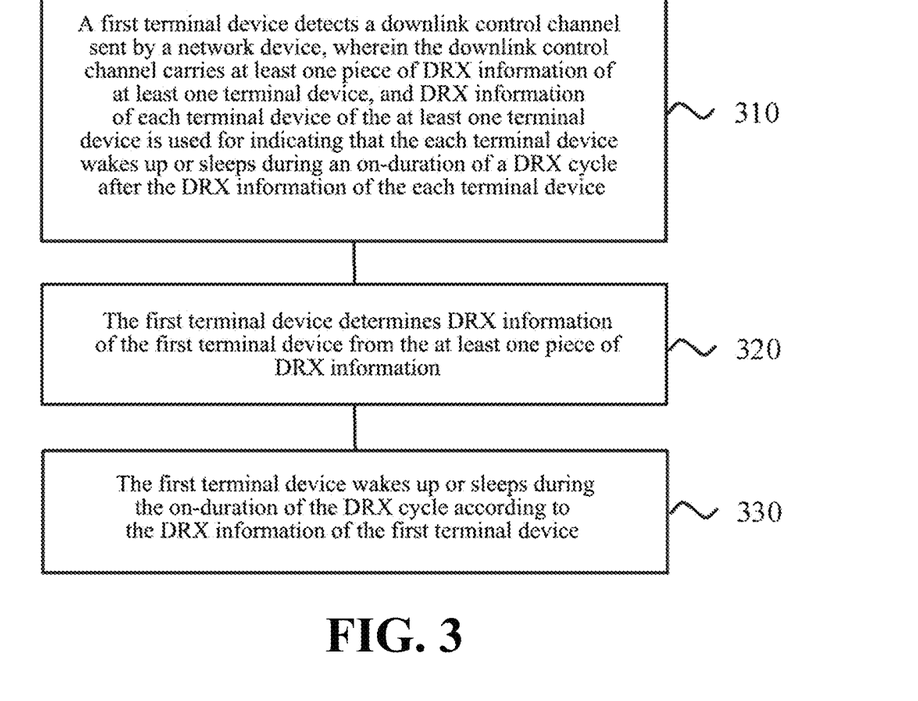
FIG. 3 is a schematic flowchart of a discontinuous reception method according to an implementation of the present application.

FIG. 3 is a schematic flowchart of a discontinuous reception method according to an implementation of the present application. The method shown in FIG. 3 may be performed by a terminal device. The terminal device is a first terminal device. The first terminal device may be, for example, a terminal device 20 shown in FIG. 1. As shown in FIG. 3, the discontinuous reception method includes acts 310-330.

In act 310, a first terminal device detects a downlink control channel sent by a network device, wherein the downlink control channel carries at least one piece of DRX information of at least one terminal device.

DRX information of each terminal device of the at least one terminal device is used for indicating that the each terminal device wakes up or sleeps during an on-duration of a DRX cycle after the DRX information of the each terminal device is detected.

In other words, DRX information of each terminal device of the at least one terminal device is used for indicating that the each terminal device wakes up or sleeps during an on-duration after the moment when the DRX information of the each terminal device is detected. The on-duration after this moment may include an on-duration in a DRX cycle where the DRX information is received, or an on-duration in a DRX cycle next to a DRX cycle where the DRX information is received.

Specifically, the network device sends the downlink control channel to the at least one terminal device to simultaneously indicate the respective DRX information to the at least one terminal device. DRX information of each terminal device is used for indicating that the each terminal device wakes up or sleeps during an on-duration of a DRX cycle after the moment when the DRX information of the each terminal device is detected. In other words, DRX information of each terminal device represents whether or not the each terminal device is scheduled during an on-duration of a DRX cycle after the moment when the DRX information of the each terminal device is detected. If a terminal device is scheduled, the terminal device needs to wake up. If the terminal device is not scheduled, the terminal device sleeps to reduce power consumption. For example, if the first terminal device detects the downlink control channel in the ith DRX cycle and acquires its own DRX information, then the DRX information may indicate the first terminal device to wake up or sleep during an on-duration of the (i+1)th DRX cycle.

Optionally, the downlink control channel carries at least one bit value, the at least one bit value corresponds to the at least one piece of DRX information one by one, and each bit value in the at least one bit value is used for representing DRX information corresponding to the each bit value.

For example, as shown in Table One, it is assumed that the downlink control channel includes N bit values, which are respectively used for representing DRX information of N terminal devices. The N bit values correspond to N pieces of DRX information of the N terminal devices one by one. If a bit value of the N bit values is 0, it indicates that DRX information corresponding to the bit value is used for indicating the terminal device to sleep during the on-duration of the subsequent DRX cycle without detecting a PDCCH, etc. If a bit value of the N bit values is 1, it indicates that DRX information corresponding to the bit value is used for indicating the terminal device to wake up during the on-duration of the subsequent DRX cycle to detect information such as a PDCCH or a paging message.

TABLE ONE

| | N Bit Values | | | | |
| --- | --- | --- | --- | --- | --- |
| Bit Value | 1 | 0 | 1 | . . . | 1 |
| DRX Information | Wake Up | Sleep | Wake Up | . . . | Wake Up |

Of course, it is also possible to use a bit value of 0 to indicate a terminal device to wake up and use a bit value of 1 to indicate a terminal device to sleep. In other words, if a bit value of the N bit values is 1, it indicates that DRX information corresponding to the bit value is used for indicating the terminal device to sleep during the on-duration of the subsequent DRX cycle without detecting a PDCCH, etc. If a bit value of the N bit values is 0, it indicates that DRX information corresponding to the bit value is used for indicating the terminal device to wake up during the on-duration of the subsequent DRX cycle to detect information such as a PDCCH or a paging message. Table 1 just illustrates an example.

Optionally, before act 310, that is, before the first terminal device detects the downlink control channel sent by the network device, the method further includes: determining, by the first terminal device, a control channel group to which the downlink control channel belongs according to a device identity of the first terminal device; and determining, by the first terminal device, a target radio network temporary identity (RNTI) corresponding to the control channel group according to a mapping relationship between multiple control channel groups and multiple RNTIs.

In this case, in act 310, detecting, by the first terminal device, the downlink control channel sent by the network device includes: detecting, by the first terminal device, the downlink control channel according to the target RNTI.

For example, the first terminal device calculates a number of the control channel group that the downlink control channel is in according to the device identity (ID) of the first terminal device, such as UE-ID, and based on UE-ID mod M. M is a positive integer and M is the total quantity of control channel groups. The first terminal device determines an RNTI used for detecting the downlink control channel according to the calculated number of the control channel group and the mapping relationship between M control channel groups and M RNTIs, and detects the downlink control channel according to the target RNTI.

Optionally, the mapping relationship between multiple control channel groups and multiple RNTIs may be notified by the network device through a radio resource control (RRC) signaling to the terminal device, or the mapping relationship may be pre-agreed between the terminal device and the network device and pre-stored in the terminal device. In addition, the mapping relationship between multiple control channel groups and multiple RNTIs may be presented by any means such as a chart, table, formula, etc.

Optionally, before act 310, that is, before the first terminal device detects the downlink control channel sent by the network device, the method further includes: receiving, by the first terminal device, first configuration information sent by the network device, wherein the first configuration information indicates a target RNTI used for detecting the downlink control channel;

In this case, in act 310, detecting, by the first terminal device, the downlink control channel sent by the network device includes: detecting, by the first terminal device, the downlink control channel according to the target RNTI.

The first configuration information may be, for example, sent by the network device to the first terminal device through an RRC signaling or a Medium Access Control (MAC) Control Element (CE), and the first terminal device may directly obtain the target RNTI through the received RRC signaling or MAC CE.

Optionally, before act 310, that is, before the first terminal device detects the downlink control channel sent by the network device, the method further includes: receiving, by the first terminal device, second configuration information sent by the network device, wherein the second configuration information is used for indicating a channel format of the downlink control channel.

In this case, in act 310, detecting, by the first terminal device, the downlink control channel sent by the network device includes: detecting, by the first terminal device, the downlink control channel according to the channel format of the downlink control channel.

The second configuration information may be, for example, sent by the network device to the first terminal device through an RRC signaling or an MAC CE, and the first terminal device may acquire a channel format used for detecting the downlink control channel through the received RRC signaling or MAC CE.

For example, it is assumed that the downlink control channel carries Download Control Information (DCI), and the DCI carries N pieces of DRX information of N terminal devices. If N is large, that is, the network device needs to send the downlink control channel to a large number of terminal devices at the same time, then the network device may use the first DCI format to send the downlink control channel carrying the DCI; If N is small, that is, the network device needs to send the downlink control channel to a small number of terminal devices at the same time, then the terminal device may use the second DCI format to send the downlink control channel carrying the DCI. The quantity of bits used for representing multiple pieces of DRX information in the DCI of the first DCI format is greater than the quantity of bits used for representing multiple pieces of DRX information in the DCI of the second DCI format. The network device indicates the used channel format (e.g., the first DCI format or the second DCI format) to the first terminal device, so that the first terminal device may detect the DCI including its own DRX information carried on the downlink control channel based on the corresponding DCI format.

Optionally, in act 310, detecting, by the first terminal device, the downlink control channel sent by the network device includes: detecting, by the first terminal device, the downlink control channel sent by the network device before the DRX cycle; or detecting, by the first terminal device, the downlink control channel sent by the network device in a first subframe or a first slot during the on-duration of the DRX cycle; or detecting, by the first terminal device, the downlink control channel sent by the network device in a common search space of a control channel.

For example, if the first terminal device detects the downlink control channel in the ith DRX cycle and determines its own DRX information according to the downlink control channel, then the DRX information may indicate the first terminal device to wake up or sleep during an on-duration of the (i+1)th DRX cycle, or indicate the first terminal device to wake up or sleep during on-durations of the (i+1)th DRX cycle and several DRX cycles after the (i+1)th DRX cycle.

For another example, if the first terminal device may detect the downlink control channel in the first subframe or the first slot in the on-duration of the ith DRX cycle and determine its own DRX information according to the downlink control channel, then the DRX information may indicate the first terminal device to wake up or sleep during the on-duration in the ith DRX cycle. For instance, the first terminal device detects the downlink control channel in the first subframe in the on-duration of a certain DRX cycle and knows that sleep is to be performed during the on-duration of the DRX cycle, the first terminal device may go to sleep from the second subframe in the on-duration of the DRX cycle till the end of the DRX cycle to reduce power consumption.

For another example, if the first terminal device detects the downlink control channel in the common search space of a control channel and determines its own DRX information according to the downlink control channel, then the DRX information indicates the first terminal device to wake up or sleep during an on-duration in one or more DRX cycles after the moment when the DRX information is detected.

In act 320, the first terminal device determines DRX information of the first terminal device from the at least one piece of DRX information.

Optionally, determining, by the first terminal device, the DRX information of the first terminal device from the at least one piece of DRX information according to the downlink control channel includes: determining, by the first terminal device, the DRX information of the first terminal device according to a number of the first terminal device, wherein the DRX information of the first terminal device is DRX information corresponding to the number in the at least one piece of DRX information.

Optionally, before the first terminal device determines the DRX information of the first terminal device according to the number of the first terminal device, the method further includes: receiving, by the first terminal device, third configuration information sent by the network device, wherein the third configuration information is used for indicating the number of the first terminal device.

The third configuration information may be, for example, sent by the network device to the first terminal device through an RRC signaling or an MAC CE, and the first terminal device may acquire the number of the first terminal device through the received RRC signaling or MAC CE.

For example, as shown in Table Two, it is assumed that the downlink control channel includes N bit values, which are respectively used for representing DRX information of N terminal devices. The N bit values correspond to N pieces of DRX information of N terminal devices one by one. When numbers of terminal devices are different, the corresponding pieces of DRX information are different, which indicates that the bit values of the DRX information are also different. If the network device informs that the number of the first terminal device is 1, the first terminal device wakes up during the on-duration of a next DRX cycle according to the corresponding bit value of 1. If the network device informs that the number of the first terminal device is 2, the first terminal device sleeps during the on-duration of a next DRX cycle according to the corresponding bit value of 0. If the network device informs that the number of the first terminal device is N, the first terminal device wakes up during the on-duration of a next DRX cycle according to the corresponding bit value of 1.

TABLE TWO

|  | Terminal Device Number | | | | |
| --- | --- | --- | --- | --- | --- |
|  | 1 | 2 | 3 | ... | N |
| Bit Value | 1 | 0 | 1 | ... | 1 |
| DRX Information | Wake Up | Sleep | Wake Up | ... | Wake Up |

In act 330, the first terminal device wakes up or sleeps during the on-duration of the DRX cycle according to the DRX information of the first terminal device.

Therefore, a network device simultaneously indicates multiple pieces of DRX information of multiple terminal devices to the multiple terminal devices, and a first terminal device of the multiple terminal devices determines its own DRX information among the multiple pieces of DRX information and wakes up or sleeps during an on-duration of a subsequent DRX cycle according to its own DRX information. Since the first terminal device can sleep during the on-duration of the DRX cycle when it is not scheduled in the subsequent DRX cycle, the power consumption of the first terminal device is further reduced.

Figure 4:
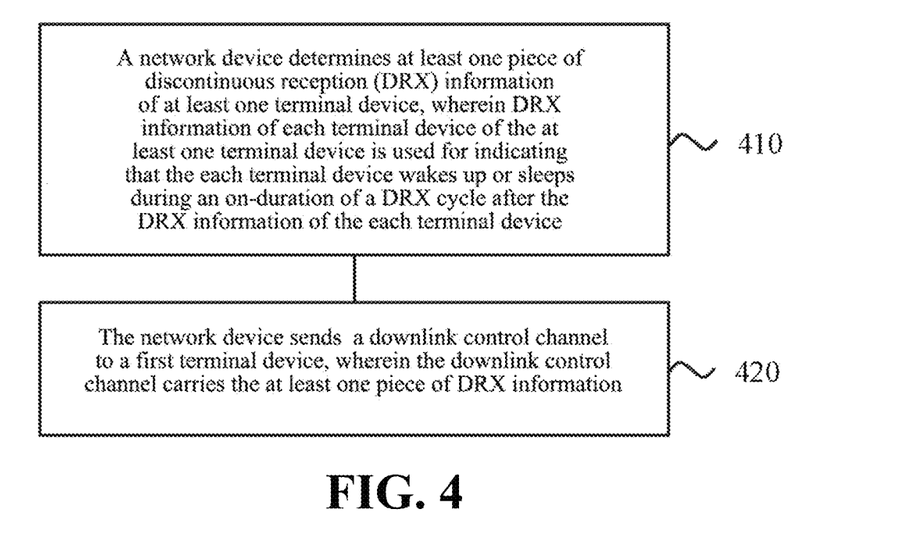
FIG. 4 is a schematic flowchart of a discontinuous reception method according to an implementation of the present application.

FIG. 4 is a schematic flowchart of a discontinuous reception method according to an implementation of the present application. The method shown in FIG. 4 may be performed by a network device. The network device may be, for example, a network device 10 shown in FIG. 1. As shown in FIG. 4, the discontinuous reception method includes: acts 410-420.

In act 410, a network device determines at least one piece of discontinuous reception (DRX) information of at least one terminal device, wherein DRX information of each terminal device of the at least one terminal device is used for indicating that the each terminal device wakes up or sleeps during an on-duration of a DRX cycle after the DRX information of the each terminal device.

In act 420, the network device sends a downlink control channel to a first terminal device, wherein the downlink control channel carries the at least one piece of DRX information, so that the first terminal device determines DRX information of the first terminal device from the at least one piece of DRX information, and wakes up or sleeps during the on-duration according to the DRX information of the first terminal device.

Therefore, a network device realizes indication of DRX information at the device level by simultaneously indicating multiple pieces of DRX information of multiple terminal devices to the multiple terminal devices, so that the multiple terminal devices can wake up or sleep during an on-duration in a subsequent DRX cycle according to the respective DRX information after determining the respective DRX information from the multiple pieces of DRX information. Thus a terminal device that is not scheduled in the subsequent DRX cycle can sleep during the on-duration of the DRX cycle, further reducing power consumption.

Optionally, the downlink control channel carries at least one bit value, the at least one bit value corresponds to the at least one piece of DRX information one by one, and each bit value in the at least one bit value is used for representing DRX information corresponding to the each bit value.

Optionally, before the network device sends the downlink control channel to the first terminal device, the method further includes: sending, by the network device, a mapping relationship between multiple control channel groups and multiple radio network temporary identities (RNTIs) to the first terminal device, wherein a target RNTI used by the first terminal device for detecting the downlink control channel is an RNTI corresponding to a control channel group to which the downlink control channel belongs.

Optionally, before the network device sends the downlink control channel to the first terminal device, the method further includes: sending, by the network device, first configuration information to the first terminal device, wherein the first configuration information indicates a target RNTI used for detecting the downlink control channel.

Optionally, before the network device sends the downlink control channel to the first terminal device, the method further includes: sending, by the network device, second configuration information to the first terminal device, wherein the second configuration information is used for indicating a channel format of the downlink control channel.

The second configuration information may be, for example, sent by the network device to the first terminal device through an RRC signaling or an MAC CE, and the first terminal device may acquire a channel format used for detecting the downlink control channel through the received RRC signaling or MAC CE.

Optionally, sending, by the network device, the downlink control channel to a first terminal device includes: sending, by the network device, the downlink control channel to the first terminal device before the DRX cycle; or sending, by the network device, the downlink control channel to the first terminal device in a first subframe or a first slot during the on-duration of the DRX cycle; or sending, by the network device, the downlink control channel to the first terminal device in a common search space of a control channel.

For example, the network device may send the downlink control channel to the at least one terminal device. If the first terminal device in the at least one terminal device detects the downlink control channel in the ith DRX cycle of the first terminal device, DRX information of the first terminal device carried in the downlink control channel may indicate that the first terminal device wakes up or sleeps during the on-duration of the (i+1)th DRX cycle of the first terminal device, or indicate the first terminal device to wake up or sleep during on-durations of the (i+1)th DRX cycle and several DRX cycles after the (i+1)th DRX cycle of the first terminal device.

For another example, the network device may send the downlink control channel to the at least one terminal device. If the first terminal device in the at least one terminal device detects the downlink control channel in the first subframe or the first slot during the on-duration in the ith DRX cycle of the first terminal device, DRX information of the first terminal device carried in the downlink control channel may indicate the first terminal device to wakes up or sleep during the on-duration of the ith DRX cycle of the first terminal device. For instance, the network device sends the downlink control channel in the first subframe in the on-duration of a certain DRX cycle of the first terminal device, the first terminal device detects the downlink control channel and knows that sleep is to be performed during the on-duration of the DRX cycle, and the first terminal device may go to sleep from the second subframe in the on-duration of the DRX cycle till the end of the DRX cycle to reduce power consumption.

For another example, the network device may send the downlink control channel to the at least one terminal device in the common search space of the control channel, so as to indicate each terminal device to wake up or sleep during an on-duration in one or more DRX cycles after the moment when its own DRX information is detected.

Optionally, before the network device sends the downlink control channel to the first terminal device, the method further includes: sending, by the network device, third configuration information to the first terminal device, wherein the third configuration information indicates a number of the first terminal device, and the DRX information of the first terminal device is DRX information corresponding to the number in the at least one piece of DRX information.

It should be understood that the specific details of the network device in the process of indicating DRX information may refer to the above description of the terminal device in FIG. 3, which is not repeated here for the sake of brevity.

It should be understood that in various implementations of the present disclosure, values of sequence numbers in the aforementioned processes do not indicate an order of execution, and the order of execution of various processes should be determined by their functions and internal logics, and should not constitute any limitation on implementation processes of implementations of the present application.

Figure 5:
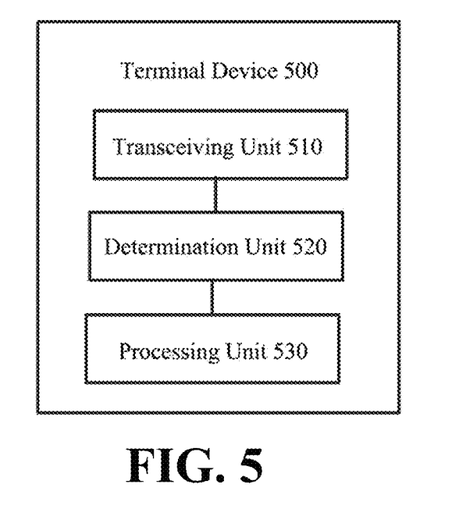
FIG. 5 is a schematic block diagram of a terminal device according to an implementation of the present application.

FIG. 5 is a schematic block diagram of a terminal device 500 according to an implementation of the present application. The terminal device is a first terminal device. As shown in FIG. 5, the first terminal device 500 includes a transceiving unit 510, a determination unit 520, and a processing unit 530.

The transceiving unit 510 is configured to detect a downlink control channel sent by a network device, wherein the downlink control channel carries at least one piece of discontinuous reception (DRX) information of at least one terminal device, and DRX information of each terminal device of the at least one terminal device is used for indicating that the each terminal device wakes up or sleeps during an on-duration of a DRX cycle after the DRX information of the each terminal device.

The determination unit 520 is configured to determine DRX information of the first terminal device from the at least one piece of DRX information detected by the transceiving unit 510.

The processing unit 530 is configured to wake up or sleep during the on-duration according to the DRX information of the first terminal device determined by the determination unit 520.

Therefore, a network device simultaneously indicates multiple pieces of DRX information of multiple terminal devices to the multiple terminal devices, and a first terminal device of the multiple terminal devices determines its own DRX information among the multiple pieces of DRX information and wakes up or sleeps during an on-duration of a subsequent DRX cycle according to its own DRX information. Since the first terminal device can sleep during the on-duration of the DRX cycle when it is not scheduled in the subsequent DRX cycle, the power consumption of the first terminal device is further reduced.

Optionally, the downlink control channel carries at least one bit value, the at least one bit value corresponds to the at least one piece of DRX information one by one, and each bit value in the at least one bit value is used for representing DRX information corresponding to the each bit value.

Optionally, the determination unit 520 is further configured to: determine a control channel group to which the downlink control channel belongs according to a device identity of the first terminal device; and determine a target radio network temporary identity (RNTI) corresponding to the control channel group according to a mapping relationship between multiple control channel groups and multiple RNTIs.

The transceiving unit 510 is specifically configured to: detect the downlink control channel according to the target RNTI.

Optionally, the transceiving unit 510 is further configured to: receive first configuration information sent by the network device, wherein the first configuration information indicates a target RNTI used for detecting the downlink control channel; and detect the downlink control channel according to the target RNTI.

Optionally, the transceiving unit 510 is further configured to: receive second configuration information sent by the network device, wherein the second configuration information is used for indicating a channel format of the downlink control channel; and detect the downlink control channel according to the channel format of the downlink control channel.

Optionally, the transceiving unit 510 is specifically configured to: detect the downlink control channel sent by the network device before the DRX cycle; or detect the downlink control channel sent by the network device in a first subframe or a first slot during the on-duration of the DRX cycle; or detect the downlink control channel sent by the network device in a common search space of a control channel.

Optionally, the determination unit 520 is specifically configured to: determine the DRX information of the first terminal device according to a number of the first terminal device, wherein the DRX information of the first terminal device is DRX information corresponding to the number in the at least one piece of DRX information.

Optionally, the transceiving unit 510 is further configured to: receive third configuration information sent by the network device, wherein the third configuration information is used for indicating the number of the first terminal device.

Figure 6:
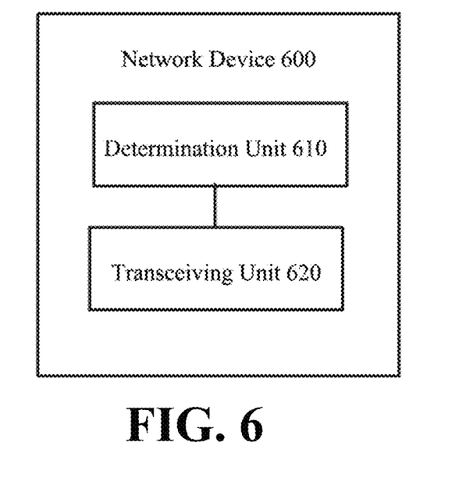
FIG. 6 is a schematic block diagram of a network device according to an implementation of the present application.

FIG. 6 is a schematic block diagram of a network device 600 according to an implementation of the present application. As shown in FIG. 6, the network device 600 includes a determination unit 610 and a transceiving unit 620.

The determination unit 610 is configured to determine at least one piece of discontinuous reception (DRX) information of at least one terminal device, wherein DRX information of each terminal device of the at least one terminal device is used for indicating that the each terminal device wakes up or sleeps during an on-duration of a DRX cycle after the DRX information of the each terminal device.

The transceiving unit 620 is configured to send a downlink control channel to a first terminal device, wherein the downlink control channel carries the at least one piece of DRX information determined by the determination unit 610, so that the first terminal device determines DRX information of the first terminal device from the at least one piece of DRX information, and wakes up or sleeps during the on-duration according to the DRX information of the first terminal device.

Therefore, a network device realizes indication of DRX information at the device level by simultaneously indicating multiple pieces of DRX information of multiple terminal devices to the multiple terminal devices, so that the multiple terminal devices can wake up or sleep during an on-duration of a subsequent DRX cycle according to the respective DRX information after determining the respective DRX information from the multiple pieces of DRX information. Thus a terminal device that is not scheduled in the subsequent DRX cycle can sleep during the on-duration of the DRX cycle, further reducing power consumption.

Optionally, the downlink control channel carries at least one bit value, the at least one bit value corresponds to the at least one piece of DRX information one by one, and each bit value in the at least one bit value is used for representing DRX information corresponding to the each bit value.

Optionally, the transceiving unit 620 is further configured to: send a mapping relationship between multiple control channel groups and multiple radio network temporary identities (RNTIs) to the first terminal device, wherein a target RNTI used by the first terminal device for detecting the downlink control channel is an RNTI corresponding to a control channel group to which the downlink control channel belongs.

Optionally, the transceiving unit 620 is further configured to: send first configuration information to the first terminal device, wherein the first configuration information indicates a target RNTI used for detecting the downlink control channel.

Optionally, the transceiving unit 620 is further configured to: send second configuration information to the first terminal device, wherein the second configuration information is used for indicating a channel format of the downlink control channel.

Optionally, the transceiving unit 620 is specifically configured to: send the downlink control channel to the first terminal device before the DRX cycle; or send the downlink control channel to the first terminal device in a first subframe or a first slot during the on-duration of the DRX cycle; or send the downlink control channel to the first terminal device in a common search space of a control channel.

Optionally, the transceiving unit 620 is further configured to: send third configuration information to the first terminal device, wherein the third configuration information indicates a number of the first terminal device, and the DRX information of the first terminal device is DRX information corresponding to the number in the at least one piece of DRX information.

Figure 7:
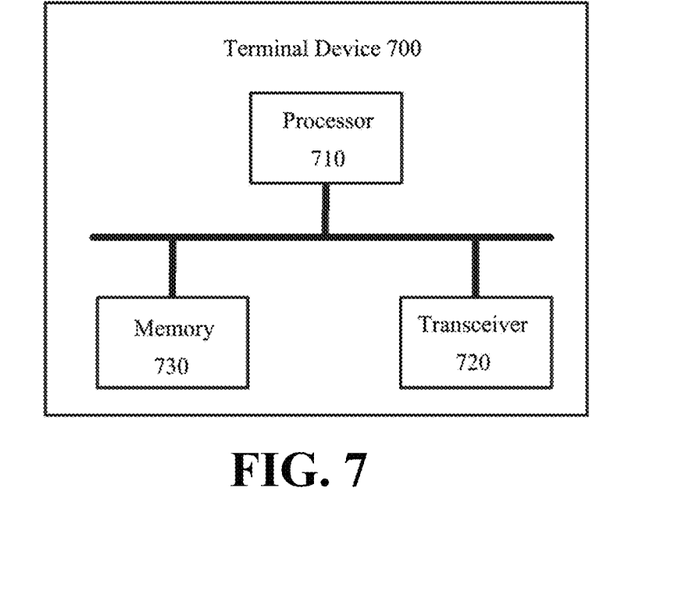
FIG. 7 is a schematic structural diagram of a terminal device according to an implementation of the present application.

FIG. 7 is a schematic structural diagram of a terminal device 700 according to an implementation of the present application. As shown in FIG. 7, the terminal device includes a processor 710, a transceiver 720, and a memory 730, wherein the processor 710, the transceiver 720, and the memory 730 communicate with each other through an internal connection path. The memory 730 is configured to store instructions, and the processor 710 is configured to execute instructions stored in the memory 730 to control the transceiver 720 to send or receive signals. The transceiver 720 is configured to: detect a downlink control channel sent by a network device, wherein the downlink control channel carries at least one piece of discontinuous reception (DRX) information of at least one terminal device, and DRX information of each terminal device of the at least one terminal device is used for indicating that the each terminal device wakes up or sleeps during an on-duration of a DRX cycle after the DRX information of the each terminal device.

The processor 710 is configured to: determine DRX information of the first terminal device from the at least one piece of DRX information detected by the transceiver 720; and wake up or sleep during the on-duration according to the DRX information of the first terminal device.

Therefore, a network device simultaneously indicates multiple pieces of DRX information of multiple terminal devices to the multiple terminal devices, and a first terminal device of the multiple terminal devices determines its own DRX information among the multiple pieces of DRX information and wakes up or sleeps during an on-duration of a subsequent DRX cycle according to its own DRX information. Since the first terminal device can sleep during the on-duration of the DRX cycle when it is not scheduled in the subsequent DRX cycle, the power consumption of the first terminal device is further reduced.

Optionally, the downlink control channel carries at least one bit value, the at least one bit value corresponds to the at least one piece of DRX information one by one, and each bit value in the at least one bit value is used for representing DRX information corresponding to the each bit value.

Optionally, the processor 710 is further configured to: determine a control channel group to which the downlink control channel belongs according to a device identity of the first terminal device; and determine a target radio network temporary identity (RNTI) corresponding to the control channel group according to a mapping relationship between multiple control channel groups and multiple RNTIs.

The transceiver 720 is specifically configured to: detect the downlink control channel according to the target RNTI.

Optionally, the transceiver 720 is further configured to: receive first configuration information sent by the network device, wherein the first configuration information indicates a target RNTI used for detecting the downlink control channel; and detect the downlink control channel according to the target RNTI.

Optionally, the transceiver 720 is further configured to: receive second configuration information sent by the network device, wherein the second configuration information is used for indicating a channel format of the downlink control channel; and detect the downlink control channel according to the channel format of the downlink control channel.

Optionally, the transceiver 720 is specifically configured to: detect the downlink control channel sent by the network device before the DRX cycle; or detect the downlink control channel sent by the network device in a first subframe or a first slot during the on-duration of the DRX cycle; or detect the downlink control channel sent by the network device in a common search space of a control channel.

Optionally, the processor 710 is specifically configured to: determine the DRX information of the first terminal device according to a number of the first terminal device, wherein the DRX information of the first terminal device is DRX information corresponding to the number in the at least one piece of DRX information.

Optionally, the transceiver 720 is further configured to: receive third configuration information sent by the network device, wherein the third configuration information is used for indicating the number of the first terminal device.

It should be understood that, in an implementation of the present application, the processor 710 may be a central processing unit (CPU), or the processor 710 may be another general purpose processor, a digital signal processor (DSP), an application specific integrated circuit (ASIC), a field programmable gate array (FPGA) or another programmable logic device, a discrete gate or a transistor logic device, or a discrete hardware component or the like. The general purpose processor may be a microprocessor or the processor may be any conventional processor or the like.

The memory 730 may include a read only memory and a random access memory, and provide instructions and data to the processor 710. A portion of memory 730 may include non-transitory random access memory.

In an implementation process, the acts of the methods described above may be accomplished by integrated logic circuits of hardware in the processor 710 or instructions in a form of software. The acts of the positioning method disclosed in the implementation of the present application may be directly accomplished by an execution of a hardware processor or accomplished by a combination of hardware and software modules in the processor 710. The software modules may be located in a storage medium commonly used in the art, such as a random access memory, flash memory, read-only memory, programmable read-only memory or electrically erasable programmable memory, or register. The storage medium is located in the memory 730, and the processor 710 reads the information in the memory 730 and accomplishes the acts of the above method in combination with its hardware. In order to avoid repetition, it will not be described in detail here.

The terminal device 700 according to the implementation of the present application may correspond to the terminal device for executing the method 300 in the method 300 and the terminal device 500 according to the implementation of the present application, and various units or modules in the terminal device 700 are respectively used for executing various acts or processing processes executed by the terminal device in the method 300. Here, in order to avoid redundancy, detailed description thereof is omitted.

Figure 8:
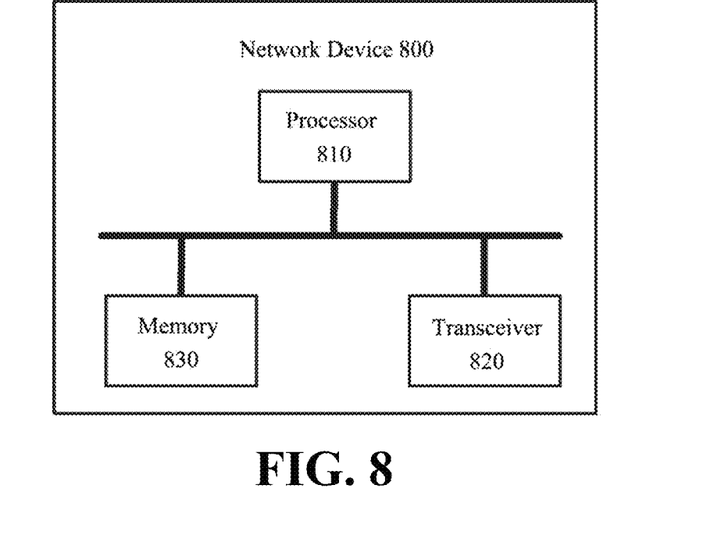
FIG. 8 is a schematic structural diagram of a network device according to an implementation of the present application.

FIG. 8 is a schematic structural diagram of a network device 800 according to an implementation of the present application. As shown in FIG. 8, the network device includes a processor 810, a transceiver 820, and a memory 830, wherein the processor 810, the transceiver 820, and the memory 830 communicate with each other through an internal connection path. The memory 830 is configured to store instructions, and the processor 810 is configured to execute instructions stored in the memory 830 to control the transceiver 820 to send or receive signals. The processor 810 is configured to: determine at least one discontinuous reception (DRX) information of at least one terminal device, wherein DRX information of each terminal device of the at least one terminal device is used for indicating that the each terminal device wakes up or sleeps during an on-duration of a DRX cycle after the DRX information of the each terminal device.

The transceiver 820 is configured to: send a downlink control channel to a first terminal device, wherein the downlink control channel carries the at least one piece of DRX information determined by the processor 810, so that the first terminal device determines DRX information of the first terminal device from the at least one piece of DRX information, and wakes up or sleeps during the on-duration according to the DRX information of the first terminal device.

Therefore, a network device realizes indication of DRX information at the device level by simultaneously indicating multiple pieces of DRX information of multiple terminal devices to the multiple terminal devices, so that the multiple terminal devices can wake up or sleep during an on-duration in a subsequent DRX cycle according to the respective DRX information after determining the respective DRX information from the multiple pieces of DRX information. Thus a terminal device that is not scheduled in the subsequent DRX cycle can sleep during the on-duration of the DRX cycle, further reducing power consumption.

Optionally, the downlink control channel carries at least one bit value, the at least one bit value corresponds to the at least one piece of DRX information one by one, and each bit value in the at least one bit value is used for representing DRX information corresponding to the each bit value.

Optionally, the transceiver 820 is further configured to: send a mapping relationship between multiple control channel groups and multiple radio network temporary identities (RNTIs) to the first terminal device, wherein a target RNTI used by the first terminal device for detecting the downlink control channel is an RNTI corresponding to a control channel group to which the downlink control channel belongs.

Optionally, the transceiver 820 is further configured to: send first configuration information to the first terminal device, wherein the first configuration information indicates a target RNTI used for detecting the downlink control channel.

Optionally, the transceiver 820 is further configured to: send second configuration information to the first terminal device, wherein the second configuration information is used for indicating a channel format of the downlink control channel.

Optionally, the transceiver 820 is specifically configured to: send the downlink control channel to the first terminal device before the DRX cycle; or send the downlink control channel to the first terminal device in a first subframe or a first slot during the on-duration of the DRX cycle; or send the downlink control channel to the first terminal device in a common search space of a control channel.

Optionally, the transceiver 820 is further configured to: send third configuration information to the first terminal device, wherein the third configuration information indicates a number of the first terminal device, and the DRX information of the first terminal device is DRX information corresponding to the number in the at least one piece of DRX information.

It should be understood that in the implementation of the present application, the processor 810 may be a Central Processing Unit (CPU), or the processor 810 may be another general purpose processor, a digital signal processors (DSP), an application specific integrated circuit (ASIC), a field programmable gate array (FPGA) or another programmable logic device, a discrete gate or transistor a logic device, or a discrete hardware component or the like. The general purpose processor may be a microprocessor or the processor may be any conventional processor or the like.

The memory 830 may include a read only memory and a random access memory, and provide instructions and data to the processor 810. A portion of memory 830 may include non-transitory random access memory. In an implementation process, the acts of the methods described above may be accomplished by integrated logic circuits of hardware in the processor 810 or instructions in a form of software. The acts of the positioning method disclosed in the implementation of the present application may be directly accomplished by an execution of a hardware processor or accomplished by a combination of hardware and software modules in the processor 810. The software modules may be located in a storage medium commonly used in the art, such as a random access memory, flash memory, read-only memory, programmable read-only memory or electrically erasable programmable memory, or register. The storage medium is located in the memory 830, and the processor 810 reads the information in the memory 830 and accomplishes the acts of the above method in combination with its hardware. In order to avoid repetition, it will not be described in detail here.

The network device 800 according to the implementation of the present application may correspond to the network device for executing the method 400 in the method 400 and the network device 600 according to the implementation of the present application, and various units or modules in the network device 800 are respectively used for executing various acts or processing processes executed by the network device in the method 400. Here, in order to avoid redundancy, detailed description thereof is omitted.

Figure 9:
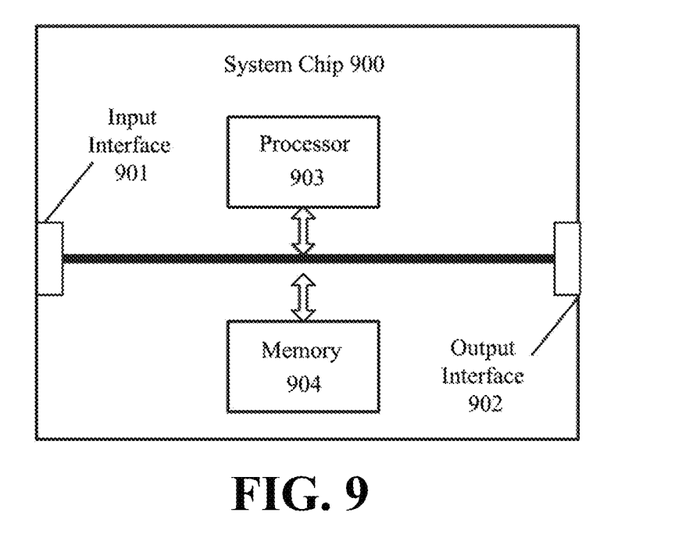
FIG. 9 is a schematic structural diagram of a system chip according to an implementation of the present application.

FIG. 9 is a schematic structural diagram of a system chip according to an implementation of the present application. The system chip 900 of FIG. 9 includes an input interface 901, an output interface 902, at least one processor 903, and a memory 904. The input interface 901, the output interface 902, the processor 903, and the memory 904 are connected to each other through an internal connection path. The processor 903 is configured to execute codes in the memory 904.

Optionally, the processor 903 may implement the method 300 executed by the terminal device in the method implementation when the codes are executed. For the sake of brevity, it will not be repeated here.

Optionally, the processor 903 may implement the method 400 executed by the network device in the method implementation when the codes are executed. For the sake of brevity, it will not be repeated here.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different methods to realize the described functions for each particular application, but such realization should not be considered to be beyond the scope of the present application.

Those skilled in the art may clearly understand that for convenience and conciseness of description, the specific working process of the system, apparatus and unit described above may refer to the corresponding process in the aforementioned implementations of methods, and details are not described herein again.

In several implementations provided by the present application, it should be understood that the disclosed system, apparatus and method may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present application may be integrated in one detection unit, or various units may be physically present separately, or two or more units may be integrated in one unit.

The functions may be stored in a computer readable storage medium if implemented in a form of software functional units and sold or used as a separate product. Based on this understanding, the technical solution of the present application, in essence, or the part contributing to the existing art, or the part of the technical solution, may be embodied in the form of a software product stored in a storage medium, including several instructions for causing a computer device (which may be a personal computer, a server, or a network device, or the like) to perform all or part of the acts of the methods described in various implementations of the present application. The aforementioned storage medium includes various media capable of storing program codes, such as a U disk, a mobile hard disk, a read-only memory (ROM), a random access memory (RAM), a magnetic disk, or an optical disk.

What are described above are merely example implementations of the present application, but the protection scope of the present application is not limited thereto. Any variation or substitution that may be easily conceived by any person skilled in the art within the technical scope disclosed by the present application shall be included within the protection scope of the present application. Therefore, the protection scope of the implementations of the present application should be subject to the protection scope of the claims.

What is claim is:

1. A method for discontinuous reception, comprising:
    detecting, by a first terminal device, a downlink control channel sent by a network device, wherein the downlink control channel carries a plurality of pieces of discontinuous reception (DRX) information of a plurality of terminal devices, and DRX information of each terminal device of the plurality of terminal devices is used for indicating that the each terminal device wakes up or sleeps during an on-duration of a DRX cycle after the DRX information of the each terminal device;
    determining, by the first terminal device, DRX information of the first terminal device from the plurality of pieces of DRX information; and
    waking up or sleeping, by the first terminal device, during the on-duration according to the DRX information of the first terminal device,
    wherein the downlink control channel carries a plurality of bit values, the plurality of bit values correspond to the plurality of pieces of DRX information one by one, and each bit value in the plurality of bit values is used for representing DRX information corresponding to the each bit value.

2. The method according to claim 1, wherein the method further comprises:
before the first terminal device detects the downlink control channel sent by the network device,
receiving, by the first terminal device, first configuration information sent by the network device, wherein the first configuration information indicates a target RNTI used for detecting the downlink control channel;
wherein detecting, by the first terminal device, the downlink control channel sent by the network device comprises:
detecting, by the first terminal device, the downlink control channel according to the target RNTI.

3. The method according to claim 1, wherein the method further comprises:
before the first terminal device detects the downlink control channel sent by the network device,
receiving, by the first terminal device, second configuration information sent by the network device, wherein the second configuration information is used for indicating a channel format of the downlink control channel;
wherein detecting, by the first terminal device, the downlink control channel sent by the network device comprises:
detecting, by the first terminal device, the downlink control channel according to the channel format of the downlink control channel.

4. A terminal device, wherein the terminal device is a first terminal device, the terminal device comprises:
a transceiver configured to detect a downlink control channel sent by a network device, wherein the downlink control channel carries a plurality of pieces of discontinuous reception (DRX) information of a plurality of terminal devices, and DRX information of each terminal device of the plurality of terminal devices is used for indicating that the each terminal device wakes up or sleeps during an on-duration of a DRX cycle after the DRX information of the each terminal device; and
a processor configured to determine DRX information of the first terminal device from the plurality of pieces of DRX information detected by the transceiver; and to wake up or sleep during the on-duration according to the determined DRX information of the first terminal device,
wherein the downlink control channel carries a plurality of bit values, the plurality of bit values correspond to the plurality of pieces of DRX information one by one, and each bit value in the plurality of bit values is used for representing DRX information corresponding to the each bit value.

5. The terminal device according to claim 4, wherein the transceiver is further configured to:
receive first configuration information sent by the network device, wherein the first configuration information indicates a target RNTI used for detecting the downlink control channel; and
detect the downlink control channel according to the target RNTI.

6. The terminal device according to claim 4, wherein the transceiver is further configured to:
receive second configuration information sent by the network device, wherein the second configuration information is used for indicating a channel format of the downlink control channel; and
detect the downlink control channel according to the channel format of the downlink control channel.

7. A network device, comprising:
a processor configured to determine a plurality of pieces of discontinuous reception (DRX) information of a plurality of terminal devices, wherein DRX information of each terminal device of the plurality of terminal devices is used for indicating that the each terminal device wakes up or sleeps during an on-duration of a DRX cycle after the DRX information of the each terminal device; and
a transceiver configured to send a downlink control channel to a first terminal device, wherein the downlink control channel carries the plurality of pieces of DRX information determined by the processor, to enable the first terminal device to determine DRX information of the first terminal device from the plurality of pieces of DRX information, and to wake up or sleep during the on-duration according to the DRX information of the first terminal device-,
wherein the downlink control channel carries a plurality of bit values, the plurality of bit values correspond to the plurality of pieces of DRX information one by one, and each bit value in the plurality of bit values is used for representing DRX information corresponding to the each bit value.

8. The network device according to claim 7, wherein the transceiver is further configured to:
send first configuration information to the first terminal device, wherein the first configuration information indicates a target RNTI used for detecting the downlink control channel.

9. The network device according to claim 7, wherein the transceiver is further configured to:
send second configuration information to the first terminal device, wherein the second configuration information is used for indicating a channel format of the downlink control channel.

10. The method according to claim 1, wherein detecting, by the first terminal device, the downlink control channel sent by the network device comprises:
detecting, by the first terminal device, the downlink control channel sent by the network device before the DRX cycle.

11. The terminal device according to claim 4, wherein the transceiver is specifically configured to:
detect the downlink control channel sent by the network device before the DRX cycle.

12. The network device according to claim 7, wherein the transceiver is specifically configured to:
send the downlink control channel to the first terminal device before the DRX cycle.

13. A method for discontinuous reception, comprising:
determining, by a network device, a plurality of pieces of discontinuous reception (DRX) information of a plurality of terminal devices, wherein DRX information of each terminal device of the plurality of terminal devices is used for indicating that the each terminal device wakes up or sleeps during an on-duration of a DRX cycle after the DRX information of the each terminal device; and
sending, by the network device, a downlink control channel to a first terminal device, wherein the downlink control channel carries the plurality of pieces of DRX information, to enable the first terminal device to determine DRX information of the first terminal device from the plurality of pieces of DRX information, and to wake up or sleep during the on-duration according to the DRX information of the first terminal device, wherein the downlink control channel carries a plurality of bit values, the plurality of bit values correspond to the plurality of pieces of DRX information one by one, and each bit value in the plurality of bit values is used for representing DRX information corresponding to the each bit value.

14. The method according to claim 13, wherein before the network device sends the downlink control channel to the first terminal device, the method further comprises:

sending, by the network device, first configuration information to the first terminal device, wherein the first configuration information indicates a target RNTI used for detecting the downlink control channel.

15. The method according to claim 13, wherein before the network device sends the downlink control channel to the first terminal device, the method further comprises:

sending, by the network device, second configuration information to the first terminal device, wherein the second configuration information is used for indicating a channel format of the downlink control channel.

16. The method according to claim 13, wherein sending, by the network device, the downlink control channel to a first terminal device comprises:

sending, by the network device, the downlink control channel to the first terminal device before the DRX cycle.

* * * * *